No. 769,248. PATENTED SEPT. 6, 1904.
S. W. BRAINARD.
PISTON AND PISTON ROD.
APPLICATION FILED APR. 12, 1904.
NO MODEL.
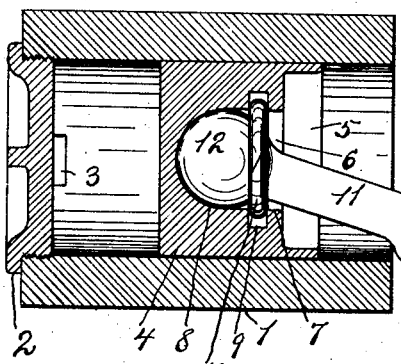
FIG. I
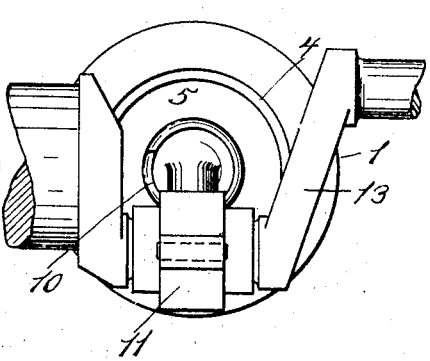
FIG. II
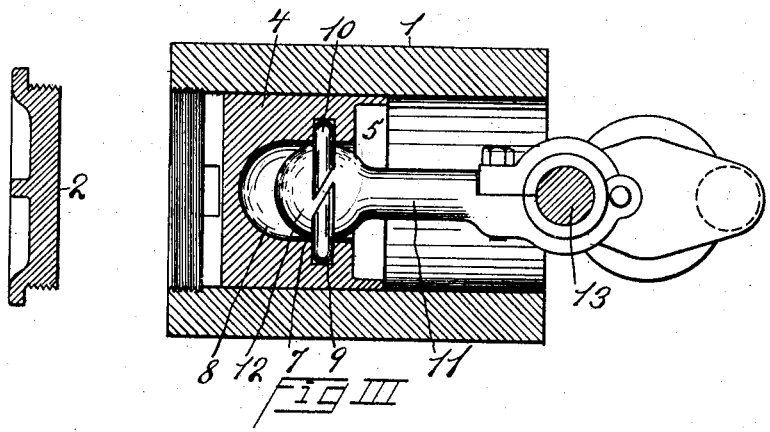
FIG. III
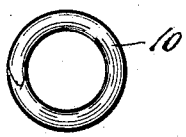
FIG. IV
Witnesses
O. E. Johnson.
W. L. Moore.
S. W. Brainard,
Inventor,
by Wm. Lecher
atty No. 769,248. Patented September 6, 1904.

UNITED STATES PATENT OFFICE.

SIDNEY W. BRAINARD, OF CLEVELAND, OHIO, ASSIGNOR TO THE CLEVELAND PNEUMATIC TOOL COMPANY, OF CLEVELAND, OHIO, A CORPORATION OF OHIO.

PISTON AND PISTON-ROD.

SPECIFICATION forming part of Letters Patent No. 769,248, dated September 6, 1904.

Application filed April 12, 1904. Serial No. 202,801. (No model.)

*To all whom it may concern:*

Be it known that I, SIDNEY W. BRAINARD, a citizen of the United States, and a resident of Cleveland, county of Cuyahoga, and State of Ohio, have invented certain new and useful Improvements in Pistons and Piston-Rods, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents an axial section of a single-acting engine-cylinder and piston and a piston-rod and crank, illustrating my improvement; Fig. II, an end view of the cylinder, piston, and piston-rod, showing the crank in side elevation; Fig. III, a section of the cylinder and piston, illustrating the mode of insertion of the piston-rod into the piston; and Fig. IV, a view of the split ring.

This invention is particularly adapted for single-acting fluid-pressure engines, although it may be employed in other forms of engine; and it consists in an improved joint for the piston-rod in the piston.

The engine-cylinder 1 illustrated in the drawings is of the single-acting type and has a detachable head in the form of a screw-cap 2 and a port 3 at the head for the admission and exhaust of the motive fluid. The piston 4 is fitted to reciprocate in the cylinder and is of the trunk-piston type. The end of the piston facing the outer end of the cylinder has a circular recess 5 and a smaller-diameter recess 6 in the bottom of the larger recess. The smaller recess has a cylindrical portion 7 and a hemispherical bottom 8. An annular groove 9 is formed in the cylindrical portion of the recess, and a split ring 10, of spring metal, is inserted into this groove. The interior diameter of the ring when closed is less than the interior diameter of the recess, and the groove is sufficiently deep to admit of the ring being expanded into it when expanded to have its interior diameter equal to that of the recess.

The piston-rod 11 has a ball 12 at its end, which exactly fits the recess in the piston, and the outer end of the piston-rod is coupled to a crank 13. The annular groove in the recess and the interior diameter of the split ring are of such dimensions that the ring will fit against the surface of the ball upon the piston-rod when the ball is fitted into the recess, or the interior diameter of the closed ring is the diameter of the sphere-segment at the central plane of the annular groove. The piston-rod has a universal joint in the piston, and the pivot-bearing of the rod upon the crank may at all times be true, regardless of any twisting of the piston in its reciprocation in the cylinder. The piston-rod may be connected to the crank and the piston may thereupon be inserted through the inner end of the cylinder, from which the cap has been removed, and pushed against the ball of the piston-rod, which will spread the split ring until the ball fits in the socket, when the ring will close and retain the ball in the socket. An easily attached and detached joint between the piston and rod is thus obtained and a joint which will permit of the most complete freedom of motion. The ease of connection and disconnection in this joint renders it particularly adaptable for small engines in which the crank-shaft is inclosed in a casing and in which such casing renders access to the joints of the piston-rod to the crank difficult, as in pneumatic drills or hoists.

Other modes of applying the principle of my invention may be employed for the mode herein explained. Change may therefore be made as regards the mechanism thus disclosed, provided the principles of construction set forth, respectively, in the following claims are employed.

I therefore particularly point out and distinctly claim as my invention—

1. The combination with a piston formed with a socket having a spherical bottom, a piston-rod having a ball at its end to fit in said socket, and a yielding retainer in the socket and constructed to open to the admission of the ball and to close to retain the same in the socket.

2. The combination with a piston formed with a cylindrical socket having a spherical bottom, a piston-rod having a ball at its end to fit in said socket, and a yielding retainer arranged in the socket to be expanded by the passage through it of the ball and to contract to retain the same in the socket.

3. The combination of a piston formed with a cylindrical socket having a hemispherical bottom and an annular groove in the cylindrical portion, a piston-rod formed with a ball at its end to fit in said socket, and a split ring sprung into the annular groove and having an interior diameter less than the diameter of the ball.

4. The combination with a cylinder having a detachable head and a crank opposed to the open end of the cylinder, of a piston formed with a socket having a spherical bottom, a piston-rod pivoted to the crank and having a ball at its other end to fit in the socket, and a yielding retainer in the socket and constructed to open to the admission of the ball and to close to retain the same in the socket.

5. The combination with a cylinder having a detachable head and a crank opposed to the open end of the cylinder, of a piston-rod pivoted to the crank and having a ball at its other end, and a piston formed with a socket having a spherical bottom and provided with an expansible and contractible closure for its open end.

6. The combination with a cylinder having a detachable head and a crank opposed to the open end of the cylinder, of a piston formed with a cylindrical socket having a hemispherical bottom and an annular groove in the cylindrical portion, a piston-rod formed with a ball at its end to fit in said socket, and a split ring sprung into the annular groove and having an interior diameter less than the diameter of the ball.

7. The combination with a piston formed with a socket having a spherical bearing-surface, of a piston-rod having an enlargement at its end formed with a corresponding bearing-surface, and a yielding retainer constructed to engage and detachably connect said parts.

In testimony that I claim the foregoing to be my invention I have hereunto set my hand this 24th day of February, A. D. 1904.

SIDNEY W. BRAINARD.

Witnesses:
LEWIS W. GREVE,
WM. SECHER.